United States Patent
Sugawa

(10) Patent No.: US 10,662,272 B2
(45) Date of Patent: May 26, 2020

(54) POLISHING COMPOSITION FOR MAGNETIC DISK SUBSTRATE

(71) Applicant: YAMAGUCHI SEIKEN KOGYO CO., LTD., Aichi (JP)

(72) Inventor: Akira Sugawa, Aichi (JP)

(73) Assignee: YAMAGUCHI SEIKEN KOGYO CO., LTD. (JP)

( * ) Notice: Subject to any disclaimer, the term of this patent is extended or adjusted under 35 U.S.C. 154(b) by 0 days.

(21) Appl. No.: 16/169,492

(22) Filed: Oct. 24, 2018

(65) Prior Publication Data

US 2019/0119422 A1 Apr. 25, 2019

(30) Foreign Application Priority Data

Oct. 24, 2017 (JP) .................. 2017-205054

(51) Int. Cl.

| | |
|---|---|
| C09K 13/06 | (2006.01) |
| C09G 1/02 | (2006.01) |
| C08F 220/06 | (2006.01) |
| C08F 220/56 | (2006.01) |
| C08F 228/02 | (2006.01) |
| C08K 3/36 | (2006.01) |
| C08K 3/32 | (2006.01) |
| C08K 3/30 | (2006.01) |
| C08K 3/16 | (2006.01) |
| C08K 5/17 | (2006.01) |
| C08K 5/092 | (2006.01) |
| C08F 220/14 | (2006.01) |
| C09G 1/00 | (2006.01) |

(52) U.S. Cl.
CPC .......... *C08F 220/06* (2013.01); *C08F 220/14* (2013.01); *C08F 220/56* (2013.01); *C08F 228/02* (2013.01); *C08K 3/16* (2013.01); *C08K 3/30* (2013.01); *C08K 3/32* (2013.01); *C08K 3/36* (2013.01); *C08K 5/092* (2013.01); *C08K 5/175* (2013.01); *C09G 1/00* (2013.01); *C08F 2800/10* (2013.01); *C08K 2003/309* (2013.01); *C08K 2003/329* (2013.01); *C08K 2201/005* (2013.01); *G11B 2220/2508* (2013.01)

(58) Field of Classification Search
CPC .................................. C09K 13/06; C09G 1/02
See application file for complete search history.

(56) References Cited

U.S. PATENT DOCUMENTS

| | | | |
|---|---|---|---|
| 2003/0110710 A1 | 6/2003 | Oshima et al. | |
| 2014/0335763 A1* | 11/2014 | Oshima | B24B 37/044 451/36 |
| 2018/0190506 A1* | 7/2018 | Ivanov | C09G 1/02 |
| 2019/0062595 A1* | 2/2019 | Taniguchi | C09G 1/02 |

FOREIGN PATENT DOCUMENTS

| | | |
|---|---|---|
| JP | 2009172709 A | 1/2008 |
| JP | 2009120850 A | 6/2009 |
| JP | 2010170650 A | 8/2010 |

* cited by examiner

*Primary Examiner* — Thomas T Pham
(74) *Attorney, Agent, or Firm* — Bracewell LLP; Brad Y. Chin

(57) ABSTRACT

Embodiments provide a polishing composition for a magnetic disk substrate containing colloidal silica, a water-soluble polymer, and water. The water-soluble polymer compound is a copolymer containing a monomer having a carboxylic acid group, a monomer having an amide group, and a monomer having a sulfonic acid group as essential monomers. The water-soluble polymer compound has a weight average molecular weight of 1,000 to 1,000,000.

8 Claims, No Drawings

POLISHING COMPOSITION FOR MAGNETIC DISK SUBSTRATE

CROSS REFERENCE TO RELATED APPLICATIONS

This application claims the benefit of and priority to Japanese Patent Application No. JP-2017-205054, filed on Oct. 24, 2017, with Japanese Patent Office, the entire contents of which are incorporated herein by reference.

BACKGROUND

Field

Embodiments relate to a polishing composition used for polishing an electronic component such as a semiconductor or a magnetic recording medium including a hard disk. Particularly, embodiments relate to a polishing composition used for polishing a surface of a substrate for a magnetic recording medium such as a glass magnetic disk substrate or an aluminum magnetic disk substrate. Furthermore, embodiments relate to a polishing composition used for polishing a surface of an aluminum magnetic disk substrate for a magnetic recording medium having an electroless nickel-phosphorus plated film formed on a surface of an aluminum alloy substrate.

Description of the Related Art

Conventionally, as a polishing composition for polishing a surface of an electroless nickel-phosphorus plated film of an aluminum magnetic disk substrate, improvement of various polishing characteristics has been desired in order to improve a magnetic recording density. For example, as for a scratch, a scratch portion may cause an error in writing or reading, or a burr portion generated around a scratch may cause head crash or the like.

Therefore, colloidal silica has come to be used for polishing an aluminum magnetic disk substrate as an abrasive grain component playing a role of mechanical polishing of a polishing composition from a viewpoint of reduction in scratches. At this time, in industrial polishing, an abrasive grain component playing a role of mechanical polishing of a polishing composition and a chemical component playing a role of chemical polishing are mixed immediately before actual polishing to be used in many cases.

However, when colloidal silica as an abrasive grain component and a chemical component are mixed, the colloidal silica tends to be aggregated. As a countermeasure against this, a trial to reduce scratches has been performed by removing a coarse particle or an aggregated particle, adjusting the shape of a particle, or adjusting corrosiveness of a polishing agent. For example, adjustment of corrosiveness of a polishing agent (Patent Document 1), adjustment of the shape of a particle (Patent Document 2), and adjustment of the content of an aggregated particle (Patent Document 3) have been proposed.

[Patent Document 1] JP-A-2009-120850
[Patent Document 2] JP-A-2009-172709
[Patent Document 3] JP-A-2010-170650

SUMMARY

Furthermore, not only reduction in scratches but also reduction in halation and reduction in waviness have been newly demanded from a viewpoint of improving a magnetic recording density.

The term "halation" as used herein means what can be detected as a minute defect on a surface of a substrate under specific inspection conditions with a disk surface inspection system (NS2000H manufactured by Hitachi High-Tech Fine Systems Co., Ltd.) described in Examples below and can be quantitatively evaluated as a halation count.

Halation is considered to be a phenomenon caused by presence of some minute nonuniformity of a substrate surface in a wide range of the substrate. A cause thereof is considered to be disharmony among characteristics possessed by a polishing pad, a carrier, the substrate, and a polishing composition. Recently, presence of halation has become a new problem as a factor for inhibiting improvement in a magnetic recording density, and reduction in halation has been demanded.

Meanwhile, regarding waviness, it has been conventionally demanded to reduce an average value of the waviness of the whole of a substrate surface. In addition, the average value and variation may tend to increase from a center portion of the substrate surface toward a periphery thereof. This is becoming a problem as a factor for inhibiting improvement in a magnetic recording density.

An object of the various embodiments is to provide a polishing composition for a magnetic disk substrate for achieving not only reduction in waviness of a substrate but also reduction in halation after polishing without decreasing productivity.

As a result of intensive studies to solve the above problems, by using the following polishing composition for a magnetic disk substrate, reduction in waviness and reduction in halation have been realized without decreasing productivity, and the various embodiments have been achieved.

According to at least one embodiment, there is provided a polishing composition for a magnetic disk substrate, including colloidal silica, a water-soluble polymer compound, and water, in which the water-soluble polymer compound is a copolymer containing a monomer having a carboxylic acid group, a monomer having an amide group, and a monomer having a sulfonic acid group as essential monomers, and has a weight average molecular weight of 1,000 to 1,000,000.

According to at least one embodiment, the colloidal silica has an average particle size (D50) of 1 to 100 nm and a concentration of 1 to 50% by mass in the composition.

According to at least one embodiment, the water-soluble polymer compound has a ratio of structural units derived from the monomer having a carboxylic acid group of 50 to 95 mol %, a ratio of structural units derived from the monomer having an amide group of 1 to 40 mol %, and a ratio of structural units derived from the monomer having a sulfonic acid group of 0.01 to 20 mol %.

According to at least one embodiment, the monomer having a carboxylic acid group is selected from the group consisting of acrylic acid, an acrylate, methacrylic acid, and a methacrylate.

According to at least one embodiment, the monomer having an amide group is N-alkylacrylamide or N-alkylmethacrylamide.

According to at least one embodiment, the monomer having a sulfonic acid group is selected from the group consisting of isoprenesulfonic acid, 2-acrylamide-2-methylpropanesulfonic acid, 2-methacrylamide-2-methylpropanesulfonic acid, styrenesulfonic acid, vinylsulfonic acid, allylsulfonic acid, isoamylenesulfonic acid, vinylnaphthalenesulfonic acid, and salts thereof.

According to at least one embodiment, the polishing composition further contains at least one of an acid and a salt, and having a pH value at 25° C. of 0.1 to 4.0.

According to at least one embodiment, the at least one of an acid and a salt is at least one selected from the group consisting of nitric acid, sulfuric acid, hydrochloric acid, phosphoric acid, phosphonic acid, pyrophosphoric acid, tripolyphosphoric acid, glutamic acid, aspartic acid, citric acid, tartaric acid, oxalic acid, nitroacetic acid, maleic acid, malic acid, succinic acid, and at least one of an organic phosphonic acid and a salt.

According to at least one embodiment, the polishing composition further includes an oxidizer.

According to at least one embodiment, the polishing composition is used for polishing an electroless nickel-phosphorus plated aluminum magnetic disk substrate.

According to various embodiments, the polishing composition for a magnetic disk substrate makes it possible to reduce waviness and to reduce halation after polishing while maintaining a polishing rate.

DETAILED DESCRIPTION

Hereinafter, various embodiments will be described. The various embodiments are not limited to the following embodiment, but change, modification, and improvement can be added thereto as long as not departing from the scope of the various embodiments.

1. Polishing Composition

A polishing composition for a magnetic disk substrate according to an embodiment contains colloidal silica, a water-soluble polymer compound, and water.

(1) Colloidal Silica

According to at least one embodiment, the colloidal silica preferably has an average particle size (D50) of 1 to 100 nm. The average particle size is more preferably from 2 to 80 nm. The colloidal silica is obtained by a water glass process for growing a particle by a condensation reaction of an alkali metal silicate such as sodium silicate or potassium silicate as a raw material in an aqueous solution. Alternatively, the colloidal silica is obtained by an alkoxysilane process for growing a particle by an acid or alkali hydrolysis condensation reaction of an alkoxysilane such as tetraethoxy silane as a raw material in water containing a water-soluble organic liquid medium such as an alcohol.

As the shape of the colloidal silica, a spherical shape, a chain shape, a kompeito-typed shape (like particles having convexes on the surface), a heteromorphic shape, or the like is known, and primary particles are monodispersed in water to form a colloidal state. As the colloidal silica used in the present invention, spherical or approximately spherical colloidal silica is preferable.

According to at least one embodiment, the colloidal silica preferably has a concentration of 1 to 50% by mass in the polishing composition. The concentration is more preferably from 2 to 40% by mass.

(2) Water-Soluble Polymer Compound

According to at least one embodiment, the water-soluble polymer compound used in the present invention is a copolymer containing a monomer having a carboxylic acid group, a monomer having an amide group, and a monomer having a sulfonic acid group as essential monomers.

(2-1) Monomer Having Carboxylic Acid Group

As the monomer having a carboxylic acid group, an unsaturated aliphatic carboxylic acid and a salt thereof are preferably used. Specific examples thereof include acrylic acid, methacrylic acid, maleic acid, itaconic acid, and salts thereof. Examples of the salts include a sodium salt, a potassium salt, a magnesium salt, an ammonium salt, an amine salt, and an alkylammonium salt.

(2-2) Monomer Having Amide Group

As the monomer having an amide group, $\alpha,\beta$-ethylenic unsaturated amide is preferably used. More specific examples thereof include an $\alpha,\beta$-ethylenic unsaturated carboxylic acid amide such as acrylamide, methacrylamide, N-alkylacrylamide, or N-alkylmethacrylamide.

According to at least one embodiment, more preferable examples thereof include N-alkylacrylamide and N-alkylmethacrylamide. Preferable specific examples of N-alkylacrylamide, N-alkylmethacrylamide, and the like include N-methylacrylamide, N-ethylacrylamide, N-n-propylacrylamide, N-iso-propylacrylamide, N-n-butylacrylamide, N-iso-butylacrylamide, N-sec-butylacrylamide, N-tert-butylacrylamide, N-methylmethacrylamide, N-ethylmethacrylamide, N-n-propylmethacrylamide, N-iso-propylmethacrylamide, N-n-butylmethacrylamide, N-iso-butylmethacrylamide, N-sec-butylmethacrylamide, and N-tert-butylmethacrylamide. Among these compounds, N-n-butylacrylamide, N-iso-butylacrylamide, N-sec-butylacrylamide, N-tert-butylacrylamide, N-n-butylmethacrylamide, N-iso-butylmethacrylamide, N-sec-butylmethacrylamide, N-tert-butylmethacrylamide, and the like are preferable.

(2-3) Monomer Having Sulfonic Acid Group

Specific examples of the monomer having a sulfonic acid group include isoprenesulfonic acid, 2-acrylamide-2-methylpropanesulfonic acid, 2-methacrylamide-2-methylpropanesulfonic acid, styrenesulfonic acid, vinylsulfonic acid, allylsulfonic acid, isoamylenesulfonic acid, vinylnaphthalenesulfonic acid, and salts thereof. Preferable examples thereof include 2-acrylamide-2-methylpropanesulfonic acid, 2-methacrylamide-2-methylpropanesulfonic acid, and salts thereof.

(2-4) Copolymer

According to at least one embodiment, the water-soluble polymer compound is preferably a copolymer obtained by combining and polymerizing these monomer components. Preferable examples of a combination for the copolymer include a combination of at least one of acrylic acid and a salt thereof, N-alkylacrylamide, and a monomer having a sulfonic acid group, a combination of the at least one of the acrylic acid and the salt thereof, N-alkylmethacrylamide, and a monomer having a sulfonic acid group, a combination of at least one of methacrylic acid and a salt thereof, N-alkylacrylamide, and a monomer having a sulfonic acid group, and a combination of at least one of methacrylic acid and a salt thereof, N-alkylmethacrylamide, and a monomer having a sulfonic acid group.

Among these combinations, a combination in which an alkyl group in N-alkylacrylamide or N-alkylmethacrylamide is at least one selected from the group consisting of an n-butyl group, an iso-butyl group, a sec-butyl group, and a tert-butyl group is particularly preferably used.

A ratio of structural units derived from a monomer having a carboxylic acid group in the water-soluble polymer compound is preferably from 50 to 95 mol %, more preferably from 60 to 93 mol %, and still more preferably from 70 to 90 mol %. A ratio of structural units derived from a monomer having an amide group is preferably from 1 to 40 mol %, more preferably from 3 to 30 mol %, and still more preferably from 5 to 20 mol %. A ratio of structural units derived from a monomer having a sulfonic acid group is preferably from 0.01 to 20 mol %, more preferably from 0.1 to 10 mol %, and still more preferably from 0.2 to 5 mol %.

(2-5) Method for Manufacturing Water-Soluble Polymer Compound

A method for manufacturing the water-soluble polymer compound is not particularly limited, but an aqueous solution polymerization process is preferable. According to the aqueous solution polymerization process, the water-soluble polymer compound can be obtained as a uniform solution.

A polymerization liquid medium in the aqueous solution polymerization is preferably an aqueous liquid medium, and particularly preferably water. In order to improve solubility of the above monomer components in a liquid medium, an organic liquid medium may be added appropriately in a range not having a bad influence on polymerization of the monomers. Examples of the organic liquid medium include an alcohol such as isopropyl alcohol and a ketone such as acetone. These liquid media can be used singly or in combination of two or more kinds thereof.

Hereinafter, a method for manufacturing the water-soluble polymer compound using the above aqueous liquid medium according to various embodiments will be described. In a polymerization reaction, a known polymerization initiator can be used, but a radical polymerization initiator is particularly preferably used.

Examples of the radical polymerization initiator include a persulfate such as sodium persulfate, potassium persulfate, or ammonium persulfate, a hydroperoxide such as t-butyl hydroperoxide, a water-soluble peroxide such as hydrogen peroxide, a ketone peroxide such as methylethyl ketone peroxide or cyclohexanone peroxide, an oil-soluble peroxide such as a dialkyl peroxide including di-t-butyl peroxide and t-butyl cumyl peroxide, and an azo compound such as azobisisobutyronitrile or 2,2-azobis(2-methylpropionamidine) dihydrochloride. These peroxide-based radical polymerization initiators may be used singly or in combination of two or more kinds thereof.

Among the above peroxide-based radical polymerization initiators, a persulfate or an azo compound is preferable, and azobisisobutyronitrile is particularly preferable because of easy control of a molecular weight of a generated water-soluble polymer compound.

According to at least one embodiment, the use amount of the radical polymerization initiator is not particularly limited. However, a ratio of the radical polymerization initiator is preferably from 0.1 to 15% by mass, and particularly preferably from 0.5 to 10% by mass based on the total mass of all the monomers of a water-soluble polymer compound. By setting this ratio to 0.1% by mass or more, a copolymerization ratio can be improved. By setting this ratio to 15% by mass or less, stability of a water-soluble polymer compound can be improved.

In some cases, the water-soluble polymer compound may be manufactured using a water-soluble redox-based polymerization initiator. Examples of the redox-based polymerization initiator include a combination of an oxidizer (for example, the above peroxide) and a reducing agent such as sodium bisulfate, ammonium bisulfite, ammonium sulfite, or sodium hydrosulfite, or a combination of an oxidizer and iron alum, potassium alum, or the like.

In manufacturing the water-soluble polymer compound, a chain transfer agent may be added appropriately to a polymerization system in order to adjust a molecular weight.

Examples of the chain transfer agent include sodium phosphite, sodium hypophosphite, potassium hypophosphite, sodium sulfite, sodium hydrogen sulfite, mercaptoacetic acid, mercaptopropionic acid, thioglycolic acid, 2-propanethiol, 2-mercaptoethanol, and thiophenol.

A polymerization temperature for manufacturing the water-soluble polymer compound is not particularly limited, but is preferably from 60 to 100° C. By setting the polymerization temperature to 60° C. or higher, a polymerization reaction proceeds smoothly to obtain excellent productivity. By setting the polymerization temperature to 100° C. or lower, coloring can be suppressed.

In addition, the polymerization reaction can be performed under an increased or reduced pressure, but is preferably performed at a normal pressure because of cost of equipment for a reaction under an increased or reduced pressure. Polymerization time is preferably from 2 to 20 hours, and particularly preferably about from 3 to 10 hours.

After the polymerization reaction, neutralization is performed with a basic compound, as necessary. Examples of the basic compound used for neutralization include an alkali metal hydroxide such as sodium hydroxide or potassium hydroxide, an alkaline earth metal hydroxide such as calcium hydroxide or magnesium hydroxide, ammonia water, and an organic amine such as monoethanolamine, diethanolamine, or triethanolamine.

After neutralization or in a case where neutralization is not performed, the water-soluble polymer compound has a pH value at 25° C. preferably of 1 to 13, more preferably of 2 to 9, still more preferably of 3 to 8 in a case where the water-soluble polymer compound has a concentration of 10% by mass.

(2-6) Weight Average Molecular Weight

According to at least one embodiment, the water-soluble polymer compound has a weight average molecular weight of 1,000 to 1,000,000, preferably of 2,000 to 800,000, more preferably of 3,000 to 600,000. Note that the weight average molecular weight of the water-soluble polymer compound is measured in terms of polyacrylic acid by gel permeation chromatography (GPC).

(2-7) Concentration

According to at least one embodiment, the water-soluble polymer compound has a concentration preferably of 0.0001 to 2.0% by mass, more preferably of 0.001 to 1.0% by mass, still more preferably of 0.005 to 0.5% by mass in the polishing composition in terms of solid content. In a case where the concentration of the water-soluble polymer compound is less than 0.0001% by mass, an effect of adding the water-soluble polymer compound cannot be obtained sufficiently. In a case where the concentration is more than 2.0% by mass, the effect of adding the water-soluble polymer compound reaches the ceiling, the water-soluble polymer compound is excessively added, and therefore this is not economical.

(3) At Least One of an Acid and a Salt Thereof

According to at least one embodiment, at least one of an acid and a salt thereof can be used for pH adjustment or as an optional component. Examples of the at least one of an acid and a salt thereof to be used include at least one of an inorganic acid and a salt thereof and at least one of an organic acid and a salt thereof.

Examples of the at least one of the inorganic acid and the salt thereof include an inorganic acid such as nitric acid, sulfuric acid, hydrochloric acid, phosphoric acid, phosphonic acid, pyrophosphoric acid, or tripolyphosphoric acid, and salts thereof.

Examples of the at least one of the organic acid and the salt thereof include an aminocarboxylic acid such as glutamic acid or aspartic acid, and salts thereof, a carboxylic acid such as citric acid, tartaric acid, oxalic acid, nitroacetic acid, maleic acid, malic acid, or succinic acid, and salts thereof, and at least one of an organic phosphonic acid and a salt thereof. These acids and salts thereof can be used singly or in combination of two or more kinds thereof.

According to at least one embodiment, the at least one of the organic phosphonic acid and the salt thereof is at least one selected from the group consisting of 2-aminoethyl phosphonic acid, 1-hydroxyethylidene-1,1-diphosphonic acid, aminotri(methylene phosphonic acid), ethylene diaminetetra(methylene phosphonic acid), diethylene triaminepenta(methylene phosphonic acid), ethane-1,1-diphosphonic acid, ethane-1,1,2-triphosphonic acid, ethane-1-hydroxy-1,1,2-triphosphonic acid, ethane-1,2-dicarboxy-1,2-diphosphonic acid, methanehydroxy phosphonic acid, 2-phosphonobutane-1,2-dicarboxylic acid, 1-phosphonobutane-2,3,4-tricarboxylic acid, α-methyl phosphono succinic acid, and salts thereof.

Use of a combination of two or more kinds of the above compounds is also a preferable embodiment. Specific examples thereof include a combination of sulfuric acid and phosphoric acid, a combination of phosphoric acid and an organic phosphonic acid, and a combination of phosphoric acid and an organic phosphonate.

(4) Oxidizer

According to at least one embodiment, an oxidizer can be used as a polishing accelerator. Examples of the oxidizer used include a peroxide, permanganic acid or a salt thereof, chromic acid or a salt thereof, peroxoacid or a salt thereof, halogen oxoacid or a salt thereof, oxoacid or a salt thereof, and a mixture of two or more kinds of these oxidizers.

Specific examples thereof include hydrogen peroxide, sodium peroxide, barium peroxide, potassium peroxide, potassium permanganate, a metal salt of chromic acid, a metal salt of dichromic acid, persulfuric acid, sodium persulfate, potassium persulfate, ammonium persulfate, peroxophosphoric acid, sodium peroxoborate, performic acid, peracetic acid, hypochlorous acid, sodium hypochlorite, and calcium hypochlorite. Among these compounds, hydrogen peroxide, persulfuric acid and a salt thereof, hypochlorous acid and a salt thereof, and the like are preferable, and hydrogen peroxide is more preferable.

According to at least one embodiment, the oxidizer preferably has a content of 0.01 to 10.0% by mass in the polishing composition. The content is more preferably from 0.1 to 5.0% by mass.

2. Physical Properties (pH) of Polishing Composition

According to at least one embodiment, the polishing composition has a pH value at 25° C. of 0.1 to 4.0. The pH value at 25° C. is preferably from 0.5 to 3.0. The pH value at 25° C. of the polishing composition of 0.1 or more can suppress waviness. The pH value at 25° C. of the polishing composition of 4.0 or less can suppress reduction in polishing rate.

According to at least one embodiment, the polishing composition can be used for polishing various electronic components such as a magnetic recording medium including a hard disk. Particularly, the polishing composition can be used preferably for polishing an aluminum magnetic disk substrate. The polishing composition can be more preferably used for polishing an electroless nickel-phosphorus plated aluminum magnetic disk substrate. Electroless nickel-phosphorus plating is usually performed at a pH value at 25° C. of 4 to 6. Nickel tends to be dissolved at a pH value at 25° C. of 4 or less, and therefore it is difficult to perform plating. Meanwhile, in polishing, for example, nickel tends to be dissolved at a pH value at 25° C. of 4.0 or less, and therefore use of the polishing composition according to an embodiment of the present invention can increase a polishing rate.

3. Method for Polishing Magnetic Disk Substrate

The polishing composition according to an embodiment is suitable for use in polishing a magnetic disk substrate such as an aluminum magnetic disk substrate or a glass magnetic disk substrate. Particularly, the polishing composition is suitable for use in polishing an electroless nickel-phosphorus plated aluminum magnetic disk substrate (hereinafter referred to as an aluminum disk).

Examples of a polishing method to which the polishing composition according to an embodiment can be applied include a method for pasting a polishing pad on a surface plate of a polishing machine, supplying a polishing composition to a surface to be polished in a polishing target (for example, an aluminum disk) or the polishing pad, and rubbing the surface to be polished with the polishing pad (called polishing). For example, in a case where front and back surfaces of an aluminum disk are polished simultaneously, a double-side polishing machine in which polishing pads are pasted on an upper surface plate and a lower surface plate is used. In this method, an aluminum disk is sandwiched by polishing pads pasted on an upper surface plate and a lower surface plate, a polishing composition is supplied between a polishing surface and each of the polishing pads, the two polishing pads are rotated simultaneously, and front and back surfaces of the aluminum disk are thereby polished.

A polyurethane type, suede type, nonwoven fabric type, or any other type polishing pad can be used.

In polishing, usually, a step called rough polishing for roughly scraping a surface of a target deeply using a polishing composition containing a polishing material having a large average particle size is performed. Subsequently, a step called finish polishing for gradually scraping the surface which has been roughly polished using a polishing composition containing a polishing material having a small average particle size is performed. The rough polishing step may include a plurality of polishing steps. The polishing composition according to an embodiment of the present invention can be preferably used in the finish polishing step.

EXAMPLES

Hereinafter, various embodiments will be specifically described based on Examples. However, the various embodiments are not limited to these Examples. It is needless to say that the various embodiments can be performed in various modes within the technical scope of the invention.

(Method for Preparing Polishing Composition)

Polishing compositions used in Examples 1 to 11 and Comparative Examples 1 to 8 contain materials listed in Table 1 in the contents or addition amounts listed in Table 1. Incidentally, in Table 1, acrylic acid is abbreviated as AA, N-tert-butylacrylamide is abbreviated as TBAA, and 2-acrylamide-2-methylpropanesulfonic acid is abbreviated as ATBS.

TABLE 1

| | Material used | Content in polishing composition | Experimental example used |
|---|---|---|---|
| Colloidal silica | Colloidal silica I (average particle size (D50): 21 nm) | 5.6% by mass | Examples 1 to 8 Comparative Examples 1 to 6 |
| | Colloidal silica II (average particle size (D50): 29 nm) | 5.6% by mass | Examples 9, 10, and 11 Comparative Examples 7 and 8 |
| Acid | Sulfuric acid | 0.8% by mass | Examples 1 to 10 Comparative Examples 1 to 8 |
| | Phosphoric acid | 0.8% by mass | Example 11 |
| | Sulfuric acid | 0.6% by mass | Example 11 |
| Oxidizer | Hydrogen peroxide | 0.6% by mass | Examples 1 to 11 Comparative Examples 1 to 8 |
| Composition of water-soluble polymer compound/weight average molecular weight | Synthesis number 1 Copolymer of AA/TBAA/ATBS = 87.5/12.0/0.5 (mol %), Weight average molecular weight = 10,000 | 0.04% by mass | Examples 1 and 9 |
| | Synthesis number 2 Copolymer of AA/TBAA/ATBS = 86.0/12.0/2.0 (mol %), Weight average molecular weight = 10,000 | 0.04% by mass | Examples 2, 10, and 11 |
| | Synthesis number 2 Copolymer of AA/TBAA/ATBS = 86.0/12.0/2.0 (mol %), Weight average molecular weight = 10,000 | 0.01% by mass | Example 3 |
| | Synthesis number 2 Copolymer of AA/TBAA/ATBS = 86.0/12.0/2.0 (mol %), Weight average molecular weight = 10,000 | 0.1% by mass | Example 4 |
| | Synthesis number 3 Copolymer of AA/TBAA/ATBS = 87.5/12.0/0.5 (mol %), Weight average molecular weight = 100,000 | 0.04% by mass | Example 5 |
| | Synthesis number 4 Copolymer of AA/TBAA/ATBS = 86.0/12.0/2.0 mol %), Weight average molecular weight = 100,000 | 0.04% by mass | Example 6 |
| | Synthesis number 5 Copolymer of AA/TBAA/ATBS = 89.5/10.0/0.5 (mol %), Weight average molecular weight = 10,000 | 0.04% by mass | Example 7 |
| | Synthesis number 6 Copolymer of AA/TBAA/ATBS = 88.0/10.0/2.0 (mol %), Weight average molecular weight = 10,000 | 0.04% by mass | Example 8 |
| | Synthesis number 7 Sodium polyacrylate, Weight average molecular weight = 10,000 | 0.04% by mass | Comparative Examples 1 and 7 |
| | Synthesis number 8 Copolymer of AA/ATBS = 90.0/10.0 (mol %), Weight average molecular weight = 10,000 | 0.04% by mass | Comparative Example 2 |
| | Synthesis number 9 Copolymer of AA/TBAA = 88.0/12.0 (mol %), Weight average molecular weight = 10,000 | 0.04% by mass | Comparative Examples 3 and 8 |
| | Synthesis number 10 Sodium polyacrylate, Weight average molecular weight = 100,000 | 0.04% by mass | Comparative Example 4 |
| | Synthesis number 11 Copolymer of AA/TBAA = 88.0/12.0 (mol %), Weight average molecular weight = 100,000 | 0.04% by mass | Comparative Example 5 |
| | Synthesis number 12 Copolymer of AA/TBAA = 90.0/10.0 (mol %), Weight average molecular weight = 10,000 | 0.04% by mass | Comparative Example 6 |

AA: acrylic acid
TBAA: N-tert-butylacrylamide
ATBS: 2-acrylamide-2-methylpropanesulfonic acid Colloidal silica I is a commercially available product having an average particle size (D50) of 21 nm. Colloidal silica II is a commercially available product having an average particle size (D50) of 29 nm.

In Examples 1 to 10 and Comparative Examples 1 to 8, 0.8% by mass of sulfuric acid was contained such that a pH value at 25° C. of a polishing composition was 1.2. Meanwhile, in Example 11, 0.8% by mass of phosphoric acid and 0.6% by mass of sulfuric acid were contained such that a pH value at 25° C. of a polishing composition was 1.2. In all Examples and Comparative Examples, 0.6% by mass of hydrogen peroxide was contained as an oxidizer.

(Water-Soluble Polymer Compound)

As the water-soluble polymer compound, as listed in Table 1, polymers with synthesis numbers 1 to 12 were used. Note that the weight average molecular weight of the water-soluble polymer compound is measured in terms of polyacrylic acid by gel permeation chromatography (GPC), and GPC measurement conditions are described below.

(GPC Conditions)

Column: G4000PWXL (manufactured by Tosoh Corporation)+G2500PWXL (manufactured by Tosoh Corporation)
Eluent: 0.2 M phosphoric acid buffer/acetonitrile=9/1 (volume ratio)
Flow rate: 1.0 ml/min
Temperature: 40° C.
Detection: 210 nm (UV)
Sample: concentration 5 mg/ml (injection amount 100 μl)
Polymer for calibration curve: polyacrylic acid molecular weight (peak top molecular weight: Mp) 115,000, 28,000, 4100, 1250 (Sowa Science Co., Ltd., American Polymer Standards Corp.)

(Particle Size of Colloidal Silica)

A particle size (Heywood diameter) of colloidal silica was measured as a Heywood diameter (projected area equivalent circular diameter) by taking a photograph in a visual field at a magnitude of 100,000 with a transmission electron microscope (TEM) (manufactured by JEOL Ltd., transmission electron microscope JEM2000FX (200 kV)) and analyzing the photograph using an analysis software (manufactured by Mountech Co., Ltd., Mac-View Ver. 4.0). The average particle size of colloidal silica is an average particle size (D50) obtained by analyzing particle sizes of about 2000 particles of colloidal silica by the above method and calculating a particle size having 50% of an accumulated particle size distribution (based on accumulated volume) from a small particle size side using the above analysis software (manufactured by Mountech Co., Ltd., Mac-View Ver. 4.0).

(Polishing Conditions)

An electroless nickel-phosphorus plated aluminum magnetic disk substrate having an outer diameter of 95 mm was roughly polished, and the resulting product was polished as a polishing target.

Polishing machine: manufactured by SpeedFam Company Limited, 9B double-side polishing machine Polishing pad: manufactured by FILWEL Co., Ltd., P2 pad Surface plate rotating speed:

| | |
|---|---|
| upper surface plate | $-8.3$ min$^{-1}$ |
| lower surface plate | $25.0$ min$^{-1}$ |

Feed rate of polishing composition: 100 ml/min

Polishing time: 300 seconds

Processing pressure: 11 kPa

Components were mixed to prepare a polishing composition. Thereafter, the polishing composition was introduced into a polishing machine through a filter having an opening of 0.45 μm, and was subjected to a polishing test. Results of the polishing test are listed in Tables 2 and 3.

(Evaluation of Disk Surface Polished)

(Polishing Rate)

The mass of an aluminum magnetic disk substrate, which had been reduced after polishing, was measured, and a polishing rate was calculated based on the following formula.

Polishing rate (μm/min)=reduction in mass of aluminum magnetic disk substrate (g)/polishing time (min)/area of one side of aluminum magnetic disk substrate (cm$^2$)/density of electroless nickel-phosphorus plated film (g/cm$^3$)/2×10$^4$ (Provided that, in the above formula, area of one side of aluminum magnetic disk substrate=65.9 cm$^2$, density of electroless nickel-phosphorus plated film=8.0 g/cm$^3$)

(Method for Evaluating Average Value of Waviness and Variation Thereof at Periphery of Substrate after Polishing)

An average value of waviness and variation thereof at periphery of a substrate were measured using a three-dimensional optical profiler New View 8300 manufactured by Ametec Corporation.

Measurement conditions are as follows.

| | |
|---|---|
| Lens | 10 times Mirau type |
| ZOOM | 1.0 time |
| Measurement Type | Surface |
| Measure Mode | CSI |
| Scan Length | 5 μm |
| Camera Mode | 1024 × 1024 |
| Filter | Band Pass |
| Cut Off | Short 20.000 μm |
| | Long 100.000 μm |
| Measuring point | Radius 46.15 mm |
| | Angle 36 points for every 10° |

Waviness at periphery of substrate was measured under the above measurement conditions. An average value of waviness and STDEV (standard deviation) thereof were determined at the above 36 observation points.

(Method for Evaluating Halation on Substrate Surface after Polishing)

Halation was measured using a disk surface inspection system NS2000H manufactured by Hitachi High-Tech Fine Systems Co., Ltd.

Measurement conditions are as follows.

| | |
|---|---|
| PMT/APD Power Control Voltage | |
| Hi-Light 1 OFF | |
| Hi-Light 2 900 V | |
| Scan Pitch | 3 μm |
| Inner/Outer Radius | 18.0000 to 47.0000 mm |
| Positive Level | 76 mV |
| H2 White Spot Level | 80.0 mV |

Halation is detected as a minute defect on a substrate surface under the above measurement conditions and can be quantitatively evaluated as a halation count.

TABLE 2

| | Colloidal silica | | Water-soluble polymer compound | | | | Waviness at periphery of substrate (Å) | | |
|---|---|---|---|---|---|---|---|---|---|
| Experimental number | Average particle size D50(nm) | Concentration (% by mass) | Synthesis number Composition (mol %) MW | Addition amount (mass %) | pH (25° C.) | Polishing rate μm/min | Average value | STDEV (Standard deviation) | Halation count |
| Example 1 | 21 | 5.6 | 1<br>AA + TBAA + ATBS 10,000<br>(87.5 + 12.0 + 0.5) | 0.04 | 1.2 | 0.093 | 0.249 | 0.004 | 321 |
| Example 2 | 21 | 5.6 | 2<br>AA + TBAA + ATBS 10,000<br>(86.0 + 12.0 + 2.0) | 0.04 | 1.2 | 0.092 | 0.247 | 0.005 | 278 |
| Example 3 | 21 | 5.6 | 2<br>AA + TBAA + ATBS 10,000<br>(86.0 + 12.0 + 2.0) | 0.01 | 1.2 | 0.090 | 0.250 | 0.006 | 299 |
| Example 4 | 21 | 5.6 | 2<br>AA + TBAA + ATBS 10,000<br>(86.0 + 12.0 + 2.0) | 0.1 | 1.2 | 0.092 | 0.246 | 0.005 | 260 |

TABLE 2-continued

| Experimental number | Colloidal silica | | Water-soluble polymer compound | | pH (25° C.) | Polishing rate μm/min | Waviness at periphery of substrate (Å) | | Halation count |
| --- | --- | --- | --- | --- | --- | --- | --- | --- | --- |
| | Average particle size D50(nm) | Concentration (% by mass) | Synthesis number Composition (mol %) MW | Addition amount (mass %) | | | Average value | STDEV (Standard deviation) | |
| Example 5 | 21 | 5.6 | 3<br>AA + TBAA + ATBS 100,000<br>(87.5 + 12.0 + 0.5) | 0.04 | 1.2 | 0.093 | 0.246 | 0.005 | 316 |
| Example 6 | 21 | 5.6 | 4<br>AA + TBAA + ATBS 100,000<br>(86.0 + 12.0 + 2.0) | 0.04 | 1.2 | 0.092 | 0.240 | 0.004 | 250 |
| Example 7 | 21 | 5.6 | 5<br>AA + TBAA + ATBS 10,000<br>(89.5 + 10.0 + 0.5) | 0.04 | 1.2 | 0.088 | 0.251 | 0.007 | 312 |
| Example 8 | 21 | 5.6 | 6<br>AA + TBAA + ATBS 10,000<br>(88.0 + 10.0 + 2.0) | 0.04 | 1.2 | 0.087 | 0.248 | 0.003 | 298 |
| Comparative Example 1 | 21 | 5.6 | 7<br>AA 10,000<br>(homopolymer) | 0.04 | 1.2 | 0.083 | 0.251 | 0.032 | 336 |
| Comparative Example 2 | 21 | 5.6 | 8<br>AA + ATBS 10,000<br>(90 + 10) | 0.04 | 1.2 | 0.081 | 0.249 | 0.033 | 285 |
| Comparative Example 3 | 21 | 5.6 | 9<br>AA + TBAA 10,000<br>(88 + 12) | 0.04 | 1.2 | 0.092 | 0.286 | 0.010 | 1004 |
| Comparative Example 4 | 21 | 5.6 | 10<br>AA 100,000<br>(homopolymer) | 0.04 | 1.2 | 0.081 | 0.247 | 0.036 | 320 |
| Comparative Example 5 | 21 | 5.6 | 11<br>AA + TBAA 100,000<br>(88 + 12) | 0.04 | 1.2 | 0.093 | 0.283 | 0.012 | 912 |
| Comparative Example 6 | 21 | 5.6 | 12<br>AA + TBAA 10,000<br>(90 + 10) | 0.04 | 1.2 | 0.087 | 0.276 | 0.018 | 785 |

AA: acrylic acid
TBAA: N-tert-butylacrylamide
ATBS: 2-acrylamide-2-methylpropanesulfonic acid

TABLE 3

| Experimental number | Colloidal silica | | Water-soluble polymer compound | | pH(25° C.) | Polishing rate μm/min | Waviness at periphery of substrate (Å) | | Halation count |
| --- | --- | --- | --- | --- | --- | --- | --- | --- | --- |
| | Average particle size D50(nm) | Concentration (% by mass) | Synthesis number Composition (mol %) MW | Addition amount (% by mass) | | | Average value | STDEV (Standard deviation) | |
| Example 9 | 29 | 5.6 | 1<br>AA + TBAA + ATBS 10,000<br>(87.5 + 12.0 + 0.5) | 0.04 | 1.2 | 0.102 | 0.250 | 0.006 | 883 |
| Example 10 | 29 | 5.6 | 2<br>AA + TBAA + ATBS 10,000<br>(86.0 + 12.0 + 2.0) | 0.04 | 1.2 | 0.100 | 0.247 | 0.004 | 785 |
| Example 11 | 29 | 5.6 | 2<br>AA + TBAA + ATBS 10,000<br>(86.0 + 12.0 + 2.0) | 0.04 | 1.2<br>phosphoric acid<br>0.8% by mass<br>sulfuric acid<br>0.6% by mass | 0.108 | 0.245 | 0.004 | 580 |
| Comparative Example 7 | 29 | 5.6 | 7<br>AA 10,000<br>(homopolymer) | 0.04 | 1.2 | 0.088 | 0.253 | 0.033 | 1021 |
| Comparative Example 8 | 29 | 5.6 | 9<br>AA + TBAA 10,000<br>(88 + 12) | 0.04 | 1.2 | 0.099 | 0.287 | 0.017 | 2653 |

AA: acrylic acid
TBAA: N-tert-butylacrylamide
ATBS: 2-acrylamide-2-methylpropanesulfonic acid (Discussion)

Table 2 indicates results in a case where abrasive grains (colloidal silica) in a polishing composition have an average particle size of 21 nm. In Examples (Examples 1 to 8) using a copolymer containing a monomer having a carboxylic acid group, a monomer having an amide group, and a monomer having a sulfonic acid group, a balance among a polishing rate, waviness, and halation is superior to each of Comparative Examples using a homopolymer containing a monomer having a carboxylic acid group (Comparative Examples 1 and 4), a copolymer containing a monomer having a carboxylic acid group and a monomer having an amide group (Comparative Examples 3, 5, and 6), and a copolymer containing a monomer having a carboxylic acid group and a monomer having a sulfonic acid group (Comparative Example 2).

In addition, Table 3 indicates results in a case where abrasive grains (colloidal silica) in a polishing composition have an average particle size of 29 nm. In Examples (Examples 9, 10, and 11) using a copolymer containing a monomer having a carboxylic acid group, a monomer having an amide group, and a monomer having a sulfonic acid group, a balance among a polishing rate, waviness, and halation is superior to each of Comparative Examples using a homopolymer containing a monomer having a carboxylic acid group (Comparative Example 7), and a copolymer containing a monomer having a carboxylic acid group and a monomer having an amide group (Comparative Example 8).

Incidentally, the polishing test results in Table 3 indicate a larger halation count as a whole than the polishing test results in Table 2. However, this is caused by a difference in average particle size of colloidal silica used as abrasive grains.

As is apparent from the above, use of a copolymer containing a monomer having a carboxylic acid group, a monomer having an amide group, and a monomer having a sulfonic acid group as a water-soluble polymer compound in a polishing composition can make a balance among a polishing rate, waviness, and halation favorable.

The polishing composition according to various embodiments can be used for polishing an electronic component such as a semiconductor or a magnetic recording medium including a hard disk. Particularly, the polishing composition can be used for polishing a surface of a substrate for a magnetic recording medium such as a glass magnetic disk substrate or an aluminum magnetic disk substrate. Furthermore, the polishing composition can be used for finish polishing of an aluminum magnetic disk substrate for a magnetic recording medium, having an electroless nickel-phosphorus plated film formed on a surface of an aluminum alloy substrate.

What is claimed is:

1. A polishing composition for a magnetic disk substrate, comprising:
    colloidal silica;
    a water-soluble polymer compound; and
    water,
    wherein the water-soluble polymer compound is a copolymer containing a monomer having a carboxylic acid group, a monomer having an amide group, and a monomer having a sulfonic acid group as essential monomers, and has a weight average molecular weight of 1,000 to 1,000,000,
    wherein the monomer having an amide group is N-alkylacrylamide or N-alkylmethacrylamide, and
    wherein the water-soluble polymer compound has a ratio of structural units derived from the monomer having a carboxylic acid group of 50 to 95 mol %, a ratio of structural units derived from the monomer having an amide group of 1 to 40 mol %, and a ratio of structural units derived from the monomer having a sulfonic acid group of 0.01 to 20 mol %, of the molar concentration of the copolymer.

2. The polishing composition for a magnetic disk substrate according to claim 1, wherein the colloidal silica has an average particle size of 1 to 100 nm and a concentration of 1 to 50% by mass in the composition.

3. The polishing composition for a magnetic disk substrate according to claim 1, wherein the monomer having a carboxylic acid group is selected from the group consisting of acrylic acid, an acrylate, methacrylic acid, and a methacrylate.

4. The polishing composition for a magnetic disk substrate according to claim 1, wherein the monomer having a sulfonic acid group is selected from the group consisting of isoprenesulfonic acid, 2-acrylamide-2-methylpropanesulfonic acid, 2-methacrylamide-2-methylpropanesulfonic acid, styrenesulfonic acid, vinyl sulfonic acid, allyl sulfonic acid, isoamylenesulfonic acid, vinylnaphthalenesulfonic acid, and salts thereof.

5. The polishing composition for a magnetic disk substrate according to claim 1, further comprising:
    at least one of an acid and a salt thereof, and having a pH value at 25° C. of 0.1 to 4.0.

6. The polishing composition for a magnetic disk substrate according to claim 5, wherein the at least one of the acid and the salt thereof is at least one selected from the group consisting of nitric acid, sulfuric acid, hydrochloric acid, phosphoric acid, phosphonic acid, pyrophosphoric acid, tripolyphosphoric acid, glutamic acid, aspartic acid, citric acid, tartaric acid, oxalic acid, nitroacetic acid, maleic acid, malic acid, succinic acid, and at least one of an organic phosphonic acid and a salt thereof.

7. The polishing composition for a magnetic disk substrate according to claim 1, further comprising:
    an oxidizer.

8. The polishing composition for a magnetic disk substrate according to claim 1, used for polishing an electroless nickel-phosphorus plated aluminum magnetic disk substrate.

* * * * *